United States Patent [19]
Spivey

[11] Patent Number: 5,697,079
[45] Date of Patent: Dec. 9, 1997

[54] AUDIO SIGNAL EDITING DEVICE FOR USE WITH A TELEVISION

[76] Inventor: Ronny Spivey, 200 Newton St., Union, Miss. 39365

[21] Appl. No.: 599,328

[22] Filed: Feb. 9, 1996

[51] Int. Cl.$^6$ ........................................... H04B 1/16
[52] U.S. Cl. ........................... 455/212; 455/221; 348/632
[58] Field of Search ................................. 455/212, 218, 455/219, 221; 348/632, 736, 738; 395/2.84, 2.87

[56] References Cited

U.S. PATENT DOCUMENTS 5,369,440  11/1994  Sussman ........................... 348/632

Primary Examiner—Chi H. Pham

[57] ABSTRACT

An audio editing device for use with a television including a memory device for storing data representative of predetermined audio signals. Also included is a comparator for comparing the digital form of an input audio signal with the data of the memory device and, upon making a match, generating a first flag at a beginning of the data. A second flag is also generated at an end of the data upon locating a match. Finally, a squelch circuit comprises a flag sensor adapted to, upon the detection of the first flag, squelch the data until the sensor detects the second flag whereat the squelch circuit resumes the unmanipulated passage of audio signals to a television set.

3 Claims, 3 Drawing Sheets

AUDIO SIGNAL EDITING DEVICE FOR USE WITH A TELEVISION

BACKGROUND OF THE INVENTION

1. Field of the Invention

The present invention relates to an audio signal editing device for use with a television and more particularly pertains to censoring morally questionable language emitted from a television or VCR.

2. Description of the Prior Art

The use of editing circuitry is known in the prior art. More specifically, editing circuitry heretofore devised and utilized for the purpose of editing visual and audio material are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,315,282 to Schumacher an editing circuitry for the study of various video images. U.S. Pat. No. 5,317,508 to Okamoto et al. discloses an image editing apparatus having a language image uniting dictionary for storing data on words. U.S. Pat. No. 5,136,503 to Takagi et al. discloses a machine translator system. U.S. Pat. No. 5,338,976 to Anwyl et al. and U.S. Pat. No. 5,323,316 to Kadashevich et al. are provided as being of general interest.

In this respect, the audio signal editing device for use with a television according to the present invention substantially departs from the conventional concepts and designs of the prior art, and in so doing provides an apparatus primarily developed for the purpose of censoring morally questionable language emitted from a television.

Therefore, it can be appreciated that there exists a continuing need for a new and improved audio signal editing device for use with a television that can be used for censoring morally questionable language emitted from a television. In this regard, the present invention substantially fulfills this need.

SUMMARY OF THE INVENTION

In view of the foregoing disadvantages inherent in the known types of editing circuitry now present in the prior art, the present invention provides an improved audio signal editing device for use with a television. As such, the general purpose of the present invention, which will be described subsequently in greater detail, is to provide a new and improved audio signal editing device for use with a television apparatus and method which has all the advantages of the prior art and none of the disadvantages.

To attain this, the present invention essentially comprises a housing with a top surface, a bottom surface, a front face, a rear face, and a pair of side edges defining an interior space. The housing is ideally positionable adjacent to a television set and associated video cassette recorder. An input jack is positioned on the rear face of the housing. The input jack is adapted to be connected to a conventional antenna and a video cassette recorder for accepting analog television signals therefrom. Situated within the interior space of the housing is an analog to digital converter. The analog to digital converter is electrically connected to the input jack for sampling an analog input audio signal associated with the television signal. By doing so, the audio signal is converted into digital form. Also included is an output jack positioned on the rear face of the housing and adapted to be connected to a conventional television set and to allow the passage of analog television signals thereto. A digital to analog converter is also situated within the interior space of the housing and is further electrically connected to the output jack. Such interconnection allows the transformation of a received digital signal into analog form and further allows the transmission of the analog signal to the television set. A double-pole single throw actuator switch is positioned on the front face of the housing where it can be easily accessed. The actuator switch is electrically connected to the input jack for allowing the unmanipulated passage of the television signals to the output jack in a first orientation. In a second orientation, the actuator switch allows the passage of the television signals to the analog to digital converter. For indicating the status of the present invention, a light emitting diode is positioned on the front face of the housing. The light emitting diode is adapted to light upon the setting of the actuator switch in the second orientation thereof. Further included is a memory device situated within the interior space of the housing for storing data representative of a set of predetermined audio signals. A digital comparator is situated within the interior space of the housing and is further electrically connected to the analog to digital converter and the memory device. The digital comparator allows the comparison of the digital form of the input audio signal with the data of the memory device and, upon making a match, generates a first flag at a beginning of the data. A second flag is also generated but situated at an end of the data upon locating a match. Finally, a squelch circuit is situated within the interior space of the housing and electrically connected between the digital comparator and digital to analog converter. The squelch circuit comprises a flag sensor adapted to continuously squelch the data upon the detection of the first flag. When the senor detects the second flag, the squelch circuit reverts to allowing the unmanipulated passage of audio signals to the digital to analog converter thereby censoring a set of predetermined audio signals received by the antenna or video cassette recorder.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved audio signal editing device for use with a television which has all the advantages of the prior art editing circuitry and none of the disadvantages.

3

It is another object of the present invention to provide a new and improved audio signal editing device for use with a television which may be easily and efficiently manufactured and marketed.

It is a further object of the present invention to provide a new and improved audio signal editing device for use with a television which is of a durable and reliable construction.

An even further object of the present invention is to provide a new and improved audio signal editing device for use with a television which is susceptible of a low cost of manufacture with regard to both materials and labor, and which accordingly is then susceptible of low prices of sale to the consuming public, thereby making such audio signal editing device for use with a television economically available to the buying public.

Still yet another object of the present invention is to provide a new and improved audio signal editing device for use with a television which provides in the apparatuses and methods of the prior art some of the advantages thereof, while simultaneously overcoming some of the disadvantages normally associated therewith.

Still another object of the present invention is to censor morally questionable language emitted from a television.

Lastly, it is an object of the present invention to provide a new and improved audio editing device for use with a television including a memory device for storing data representative of predetermined audio signals. Also included is a comparator for comparing the digital form of an input audio signal with the data of the memory device and, upon making a match, generating a first flag at a beginning of the data. A second flag is also generated at an end of the data upon locating a match. Finally, a squelch circuit comprises a flag sensor adapted to, upon the detection of the first flag, squelch the data until the sensor detects the second flag whereat the squelch circuit resumes the unmanipulated passage of audio signals to a television set.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

4

DESCRIPTION OF THE PREFERRED EMBODIMENT

Figure 1:
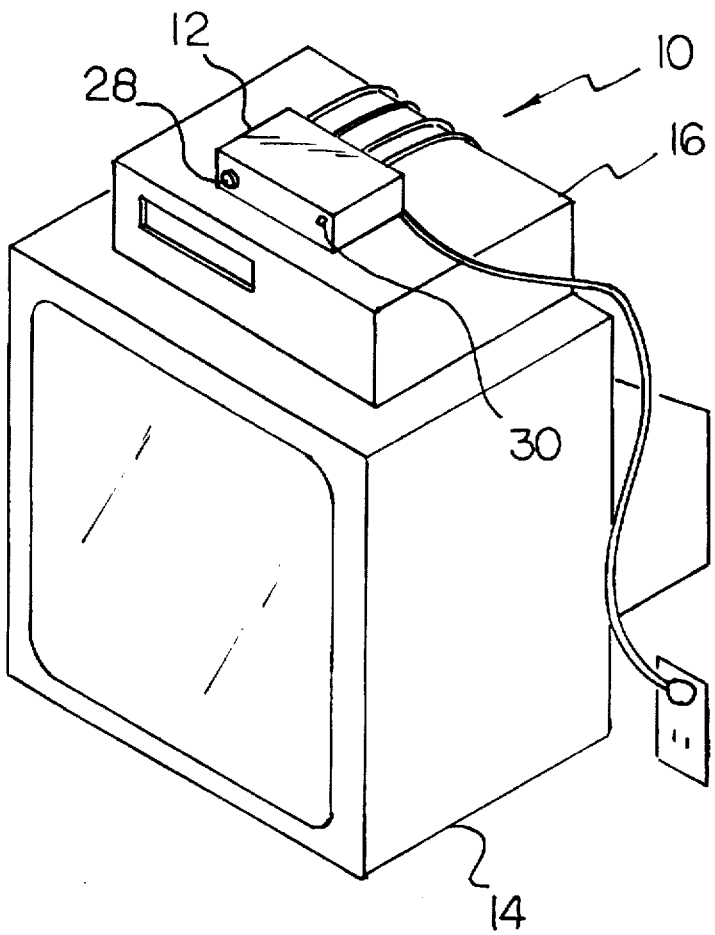
FIG. 1 is a perspective illustration of the preferred embodiment of the audio signal editing device for use with a television constructed in accordance with the principles of the present invention.
Figure 2:
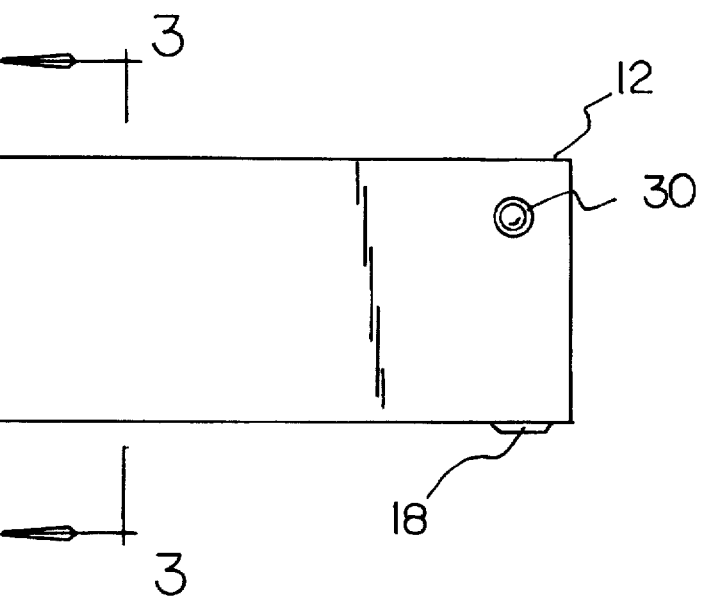
FIG. 2 is a front plan view of the present invention depicting the actuator switch and light emitting diode thereof.
Figure 3:
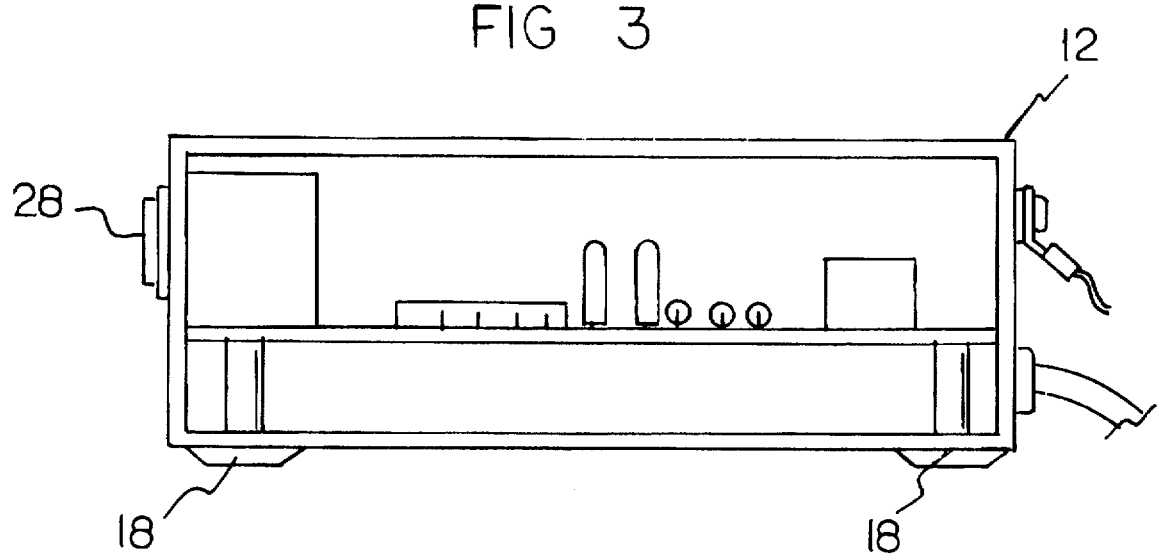
FIG. 3 is a cross-sectional view of the present invention taken along line 3—3 shown in FIG. 2.
Figure 4:
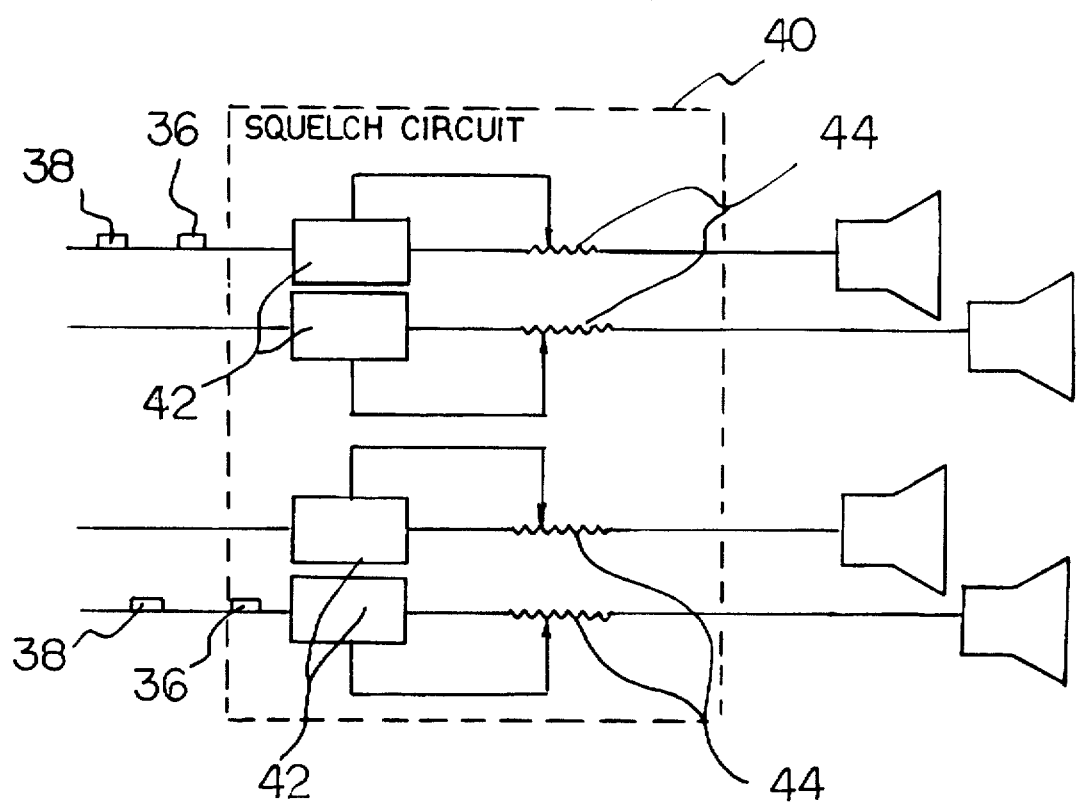
FIG. 4 is a schematic diagram of the squelch circuit.
Figure 5:
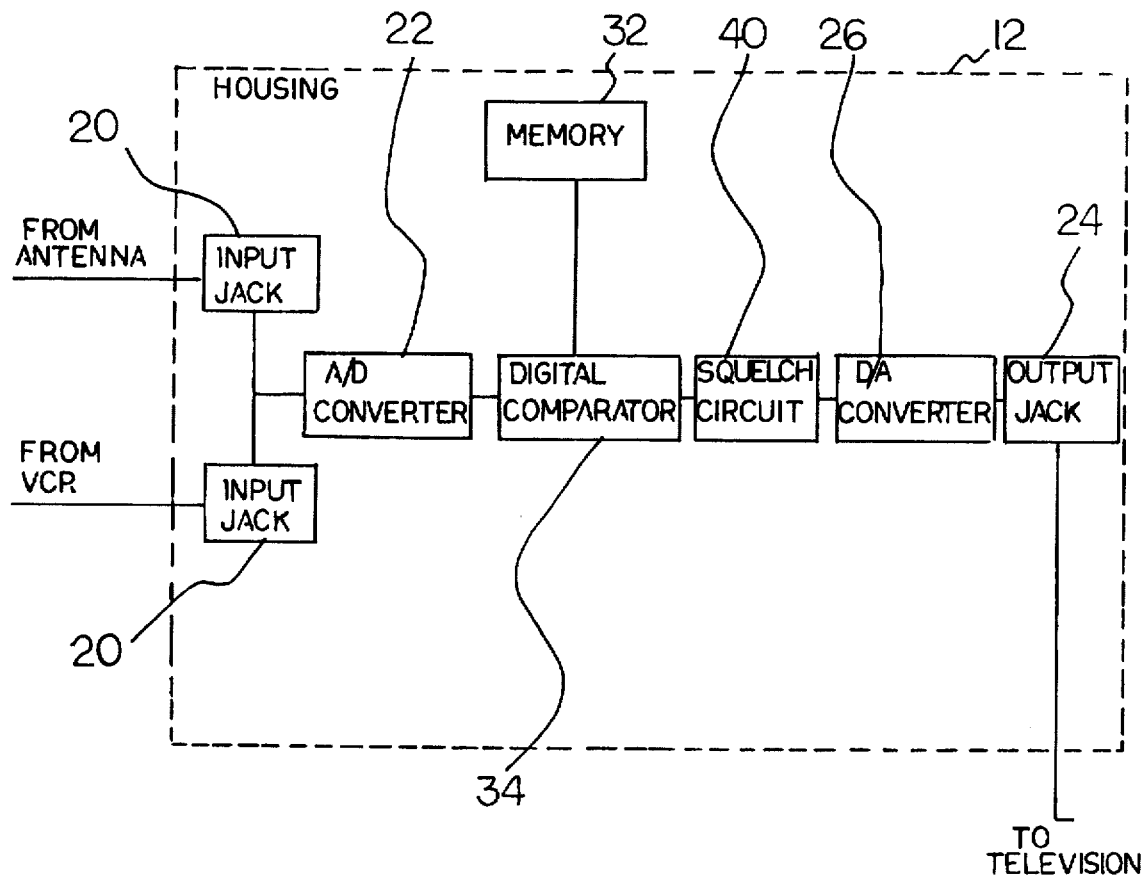
FIG. 5 is a schematic diagram of the circuitry employed in the present invention.

With reference now to the drawings, and in particular to FIGS. 1 through 5 thereof, a new and improved audio signal editing device for use with a television embodying the principles and concepts of the present invention and generally designated by the reference numeral 10 will be described.

The present invention, the new and improved audio signal editing device for use with a television, is comprised of a plurality of components. Such components in their broadest context include a housing, input jack, analog to digital converter, output jack, digital to analog converter, actuator switch, light emitting diode, memory device, digital comparator, and squelch circuit. Such components are individually configured and correlated with respect to each other so as to attain the desired objective.

More specifically, it will be noted that the system 10 of the present invention includes a housing 12 with a top surface, a bottom surface, a front face, a rear face, and a pair of side edges defining an interior space. The housing is ideally positionable adjacent to a television set 14 and associated video cassette recorder 16. To preclude damage to the television and video cassette recorder, a plurality of pads 18 are situated on the bottom surface of the housing.

An input jack 20 is suitably positioned on the rear face of the housing. The input jack is adapted to be connected to a conventional antenna and a video cassette recorder for accepting analog television signals therefrom. The input jack may be capable of accepting either a coaxial cable or a double copper splice depending on which is employed for supplying signals to the television set. A coaxial cable is often utilized by cable vendors.

Situated within the interior space of the housing is an analog to digital converter. The analog to digital converter 22 is electrically connected to the input jack for sampling an input analog audio signal associated with the television signal. By doing so, the audio signal is converted into digital.

Also included is an output jack 24 positioned on the rear face of the housing and adapted to be connected to a conventional television set and to allow the passage of analog television signals thereto. Similar to the input jack, the output jack may be capable of accepting either a coaxial cable or a double copper splice.

A digital to analog converter 26 is also situated within the interior space of the housing and is further electrically connected to the output jack. Such interconnection allows the transformation of a received digital signal into analog form and further allows the transmission of the analog signal to the television set.

A double-pole single throw actuator switch 28 is positioned on the front face of the housing where it can be easily accessed. The actuator switch is electrically connected to the input jack for allowing the unmanipulated passage of the television signals to the output jack in a first orientation. In a second orientation, the actuator switch allows the passage of the television signals to the analog to digital converter. Alternatively, a lock may be incorporated with the double-pole single throw actuator switch to preclude the disabling of the device by unauthorized persons.

For indicating the status of the present invention, a light emitting diode 30 is positioned on the front face of the housing. The light emitting diode is adapted to light upon the setting of the actuator switch in the second orientation thereof.

Further included is a memory device 32 situated within the interior space of the housing for storing data representative of a set of predetermined audio signals. Such an audio signal constitutes a morally questionable word or phrase. As an option, a speaker may be connected to the analog to digital converter so as to allow a user to store additional data within the memory device thus expanding the versatility of the present invention.

A digital comparator 34 is situated within the interior space of the housing and is further electrically connected to the analog to digital converter and the memory device. The digital comparator allows the comparison of the digital form of the input audio signal with the data of the memory device and, upon making a match, generates a first flag 36 at a beginning of the data. A second flag 38 is also generated but situated at an end of the data upon locating a match. Such flags constitute a specific byte of digital information.

Finally, a squelch circuit 40 is situated within the interior space of the housing and is electrically connected between the digital comparator and digital to analog converter. The squelch circuit comprises a flag sensor 42 adapted to continuously squelch the data upon the detection of the first flag. When the senor detects the second flag, the squelch circuit reverts to allowing the unmanipulated passage of audio signals to the digital to analog converter thereby censoring a set of predetermined audio signals received by the antenna or video cassette recorder. The squelch circuit includes a plurality of potentiometers 44 which aid in the squelching of the data upon matching.

In use, the present invention affords a method of editing a predetermined set of language emitted from a television set. The audio signal editing device for use with a television may also be retrofitted to an existing radio with only minor alterations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved audio signal editing device for use with a television comprising, in combination:

a housing with a top surface, a bottom surface, a front face, a rear face, and a pair of side edges defining an interior space;

an input jack positioned on the rear face of the housing and adapted to be connected to a conventional antenna and a video cassette recorder for accepting analog television signals therefrom;

an analog to digital converter situated within the interior space of the housing and electrically connected to the input jack for sampling an input analog audio signal associated with the television signal thus converting the audio signal into digital form;

an output jack positioned on the rear face of the housing and adapted to be connected to a conventional television set and to allow the passage of analog television signals thereto;

a digital to analog converter situated within the interior space of the housing and electrically connected to the output jack for transforming a received digital signal into analog form and further transmitting the analog signal thereto;

a double-pole single throw actuator switch positioned on the front face of the housing and electrically connected to the input jack for allowing the unmanipulated passage of the television signals to the output jack in a first orientation and further allowing the passage of the television signals to the analog to digital converter in a second orientation thereof;

a light emitting diode positioned on the front face of the housing and adapted to light upon the setting of the actuator switch in the second orientation thereof;

memory means situated within the interior space of the housing for storing data representative of a set of predetermined audio signals;

a digital comparator situated within the interior space of the housing and electrically connected to the analog to digital converter and the memory means for comparing the digital form of the input audio signal with the data of the memory means and further generating a first flag at a beginning of the data and a second flag at an end of the data upon locating a match; and a squelch circuit situated within the interior space of the housing and electrically connected between the digital comparator and digital to analog converter, the squelch circuit comprising a flag sensor adapted to continuously squelch the data upon the detection of the first flag until the sensor detects the second flag whereat the squelch circuit allows the unmanipulated passage of audio signals to the digital to analog converter thereby censoring a set of predetermined audio signals received by the antenna or video cassette recorder.

2. An audio signal editing device comprising:

memory means for storing data representative of a set of predetermined audio signals;

comparator means for comparing the digital form of an input audio signal with the data of the memory means and further generating a first flag at a beginning of the data and a second flag at an end of the data upon locating a match;

a squelch means comprising a flag sensor adapted to continuously squelch the data upon the detection of the first flag until the sensor detects the second flag whereat the squelch circuit allows the unmanipulated passage of audio signals to a communication means thereby censoring a set of predetermined audio signals received;

an output jack adapted to be connected to a conventional television set and to allow the passage of analog television signals thereto; and an input jack adapted to be connected to a conventional antenna and a video cassette recorder for accepting analog television signals therefrom.

3. An audio signal editing device comprising:

memory means for storing data representative of a set of predetermined audio signals;

comparator means for comparing the digital form of an input audio signal with the data of the memory means and further generating a first flag at a beginning of the data and a second flag at an end of the data upon locating a match;

a squelch means comprising a flag sensor adapted to continuously squelch the data upon the detection of the first flag until the sensor detects the second flag whereat the squelch circuit allows the unmanipulated passage of audio signals to a communication means thereby censoring a set of predetermined audio signals received;

an analog to digital converter electrically for sampling the input analog audio signal associated with the television signal thus converting the audio signal into digital form;

a digital to analog converter for transforming a received digital signal into analog form and further transmitting the analog signal therefrom; and a digital comparator electrically connected to the analog to digital converter and the memory means.

* * * * *